July 25, 1967 L. HEDBORG 3,332,561
METHOD AND APPARATUS FOR TURNING AND STACKING OBJECTS
Filed Nov. 20, 1963 8 Sheets-Sheet 3
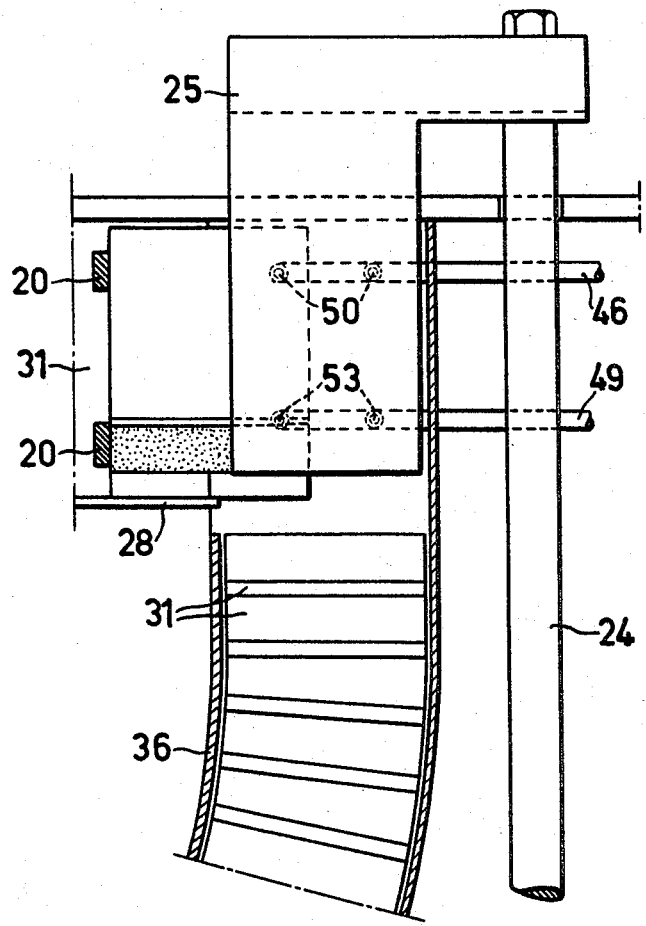

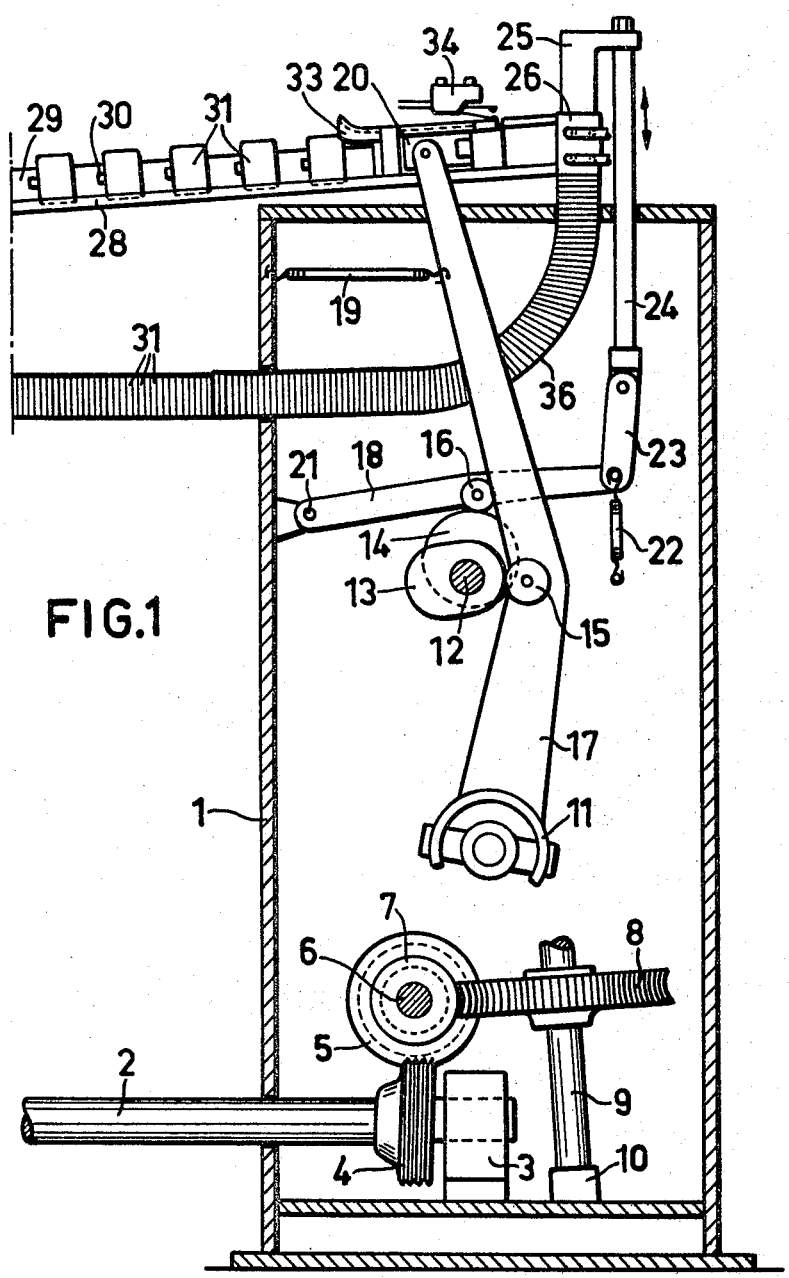

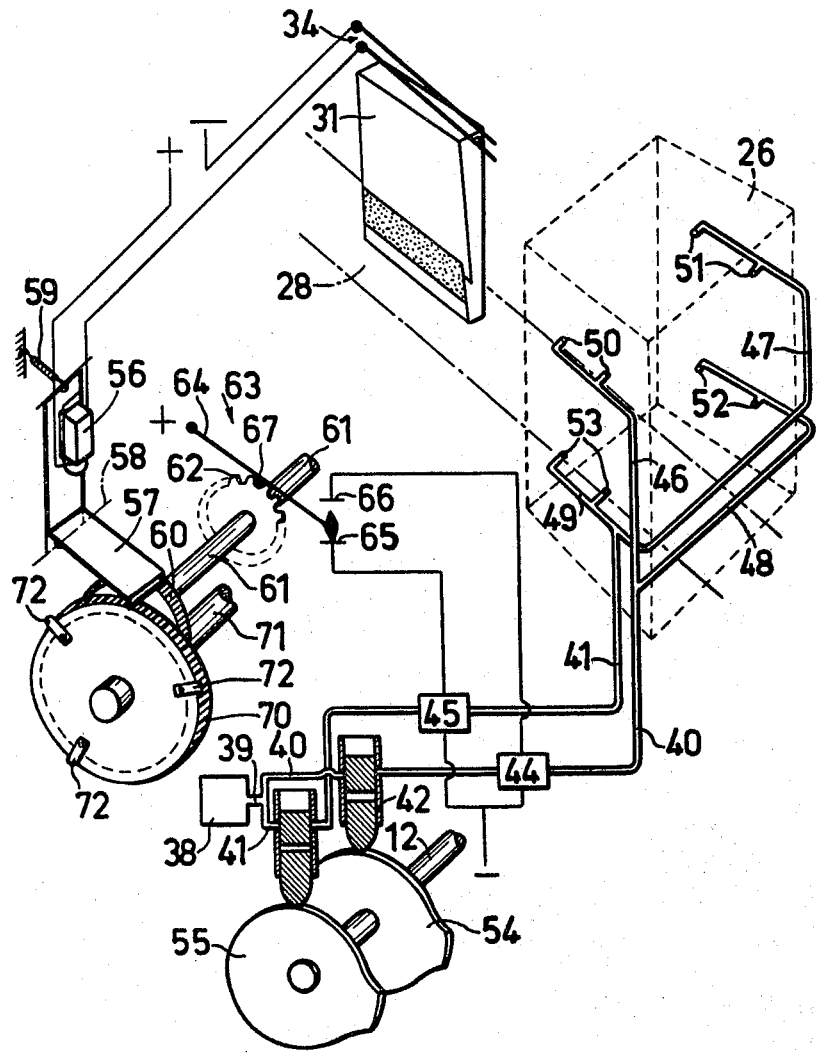

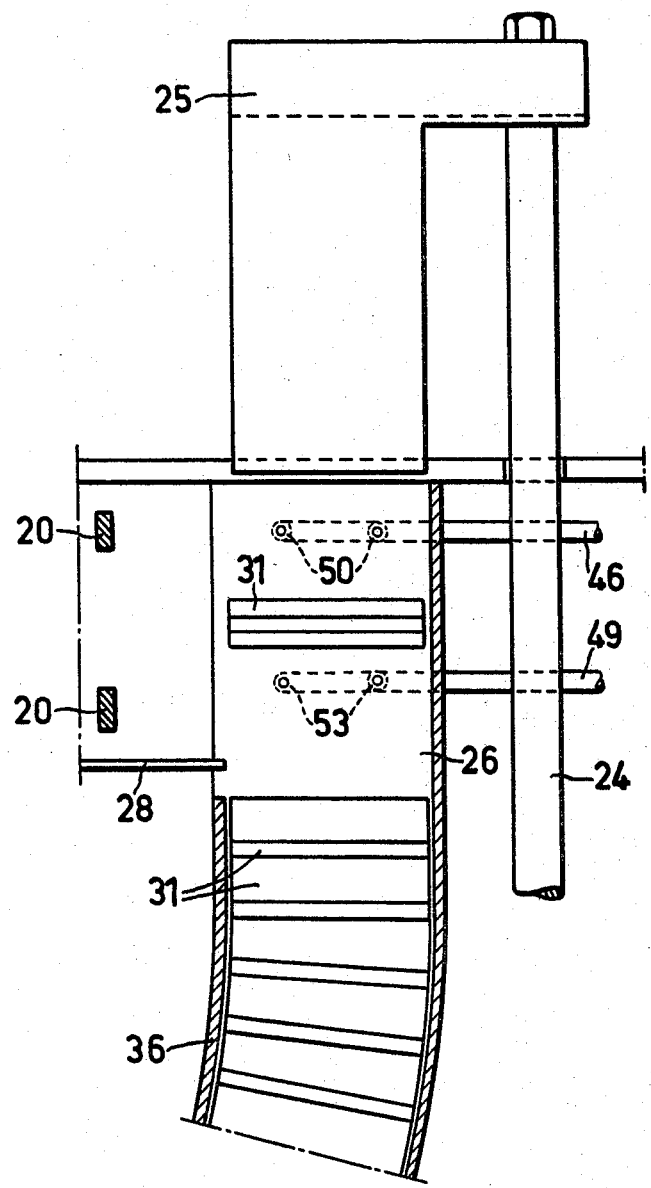

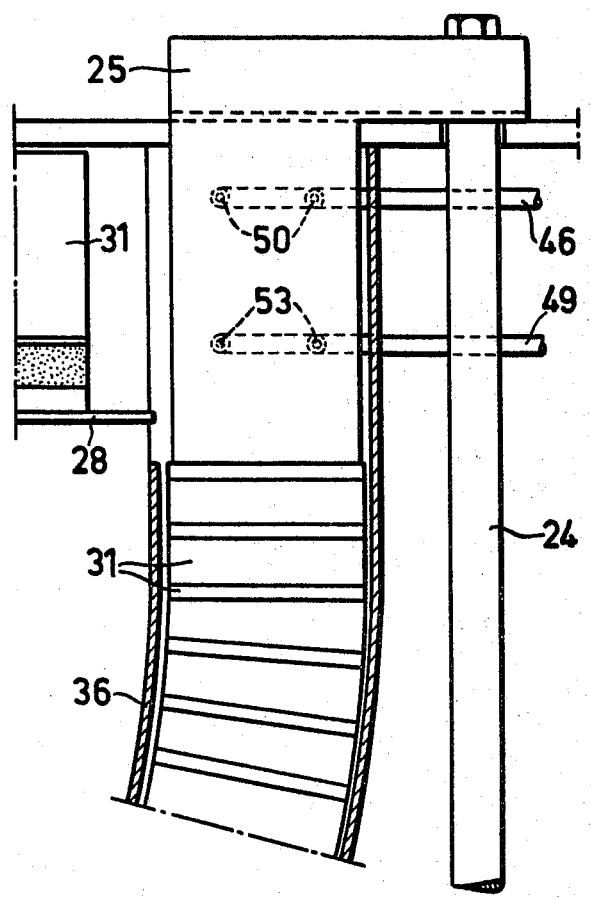

July 25, 1967 L. HEDBORG 3,332,561
METHOD AND APPARATUS FOR TURNING AND STACKING OBJECTS
Filed Nov. 20, 1963 8 Sheets-Sheet 6
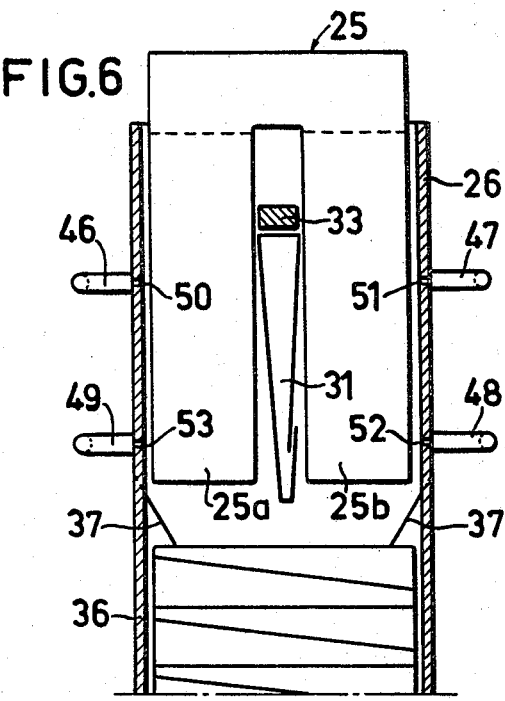
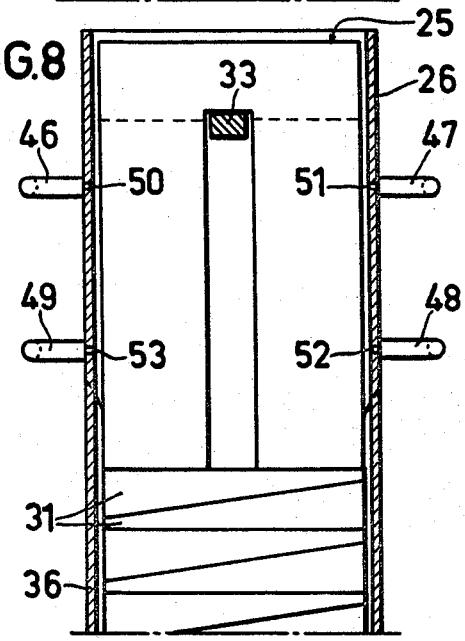

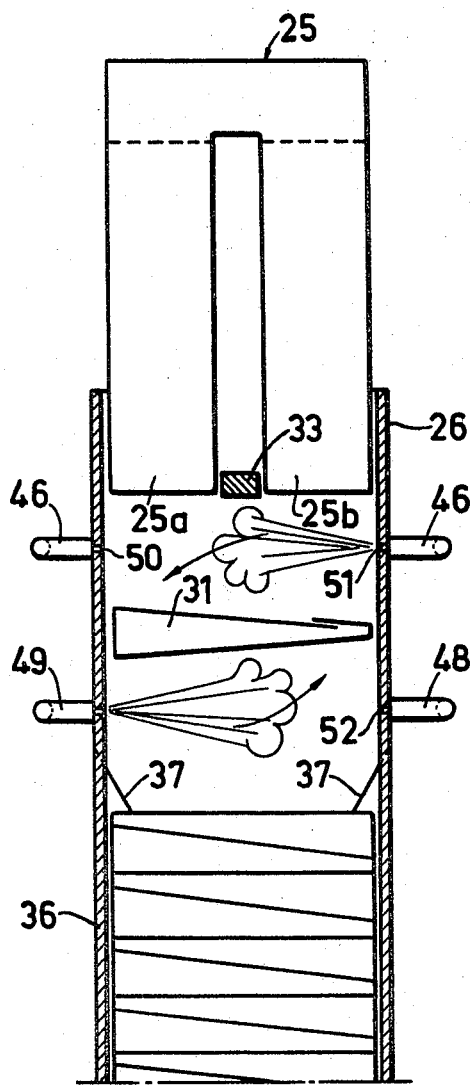

July 25, 1967  L. HEDBORG  3,332,561
METHOD AND APPARATUS FOR TURNING AND STACKING OBJECTS
Filed Nov. 20, 1963  8 Sheets-Sheet 8
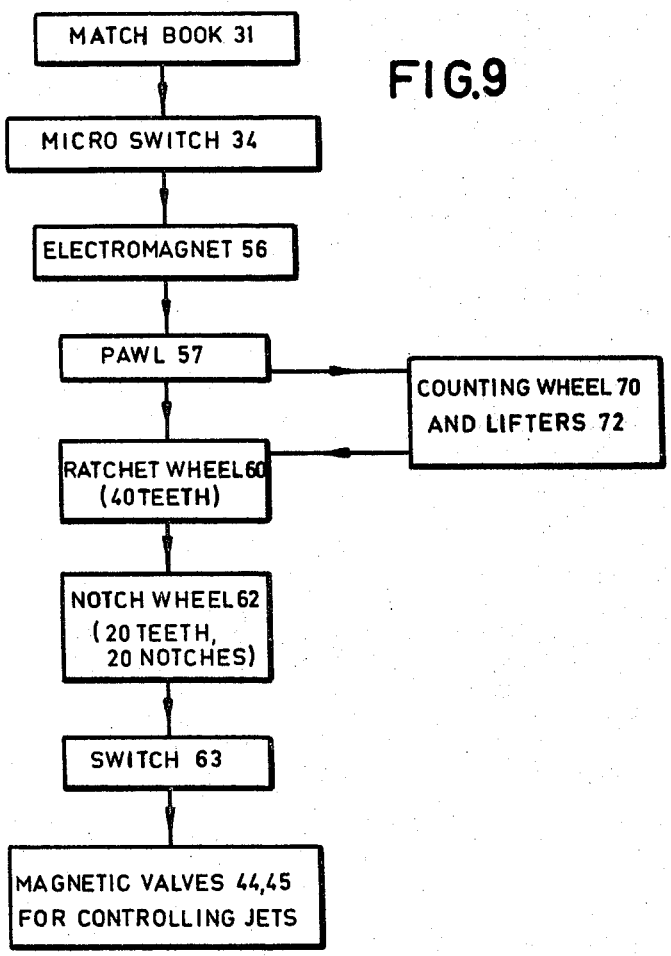

United States Patent Office 3,332,561
Patented July 25, 1967

3,332,561
METHOD AND APPARATUS FOR TURNING AND STACKING OBJECTS
Lennart Hedborg, Grammont, Belgium, assignor to Aktiebolaget Siefvert & Fornander, Kalmar, Sweden
Filed Nov. 20, 1963, Ser. No. 324,953
Claims priority, application Sweden, Nov. 21, 1962, 12,488/62
11 Claims. (Cl. 214—6.5)

This invention relates to a method of turning objects, particularly match books which are transferred in a series from a book match making machine to a packing station, and to an apparatus for carrying out this method.

The method according to the invention is primarily adapted to be applied to such rather thin and flat objects as are not of uniform thickness but are more or less wedge-shaped, that is are thinner at their one end than at the other. Above all, this method is utilized in the sorting and packing of such objects as in connection with the packing are to be turned in such a way, that adjacent objects in the packet are turned in mutually opposite directions. A specific example of objects of this kind is match books, and the invention will now be described as applied to match books.

At the output end of a continuous book-match making machine the operator or attendant has hitherto fed the machine with cover cardboard and staple wire and supervised the manufacture. The finished match books coming out from the machine were permitted to drop pell-mell into containers which were transported by this attendant to a big table on to which the match books were emptied. A plurality of attendants placed around the table arranged the match books in alternate alignment and put them into cartons of 100 or 200 match books each.

The principal object of the invention is to reduce to the greatest possible extent the manual labour hitherto required for sorting and packing match books and the like.

With this and other objects in view the method according to the invention is primarily characterised in that substantially every second object is turned in one direction and the remaining objects are turned in the opposite direction by the action of two sets of intermittent jets of a compressed fluid which are alternately directed against substantially symmetrically located areas of each object in such a way, that the jets of one set impart to the object a turning moment in one direction on an approximately predetermined axis of rotation and the jets of the other set impart to the object a turning moment in the opposite direction on substantially the same axis of rotation.

An advantageous apparatus for carrying out this method comprises a turning chamber, a feeding device for introducing the objects one by one in a predetermined approximate position in said turning chamber, a source of compressed fluid, a plurality of jet nozzles opening into said turning chamber, ducts connecting said source of compressed fluid to said jet nozzles, valve means arranged in said ducts for controlling the supply of compressed fluid to said jet nozzles, and control means for actuating said valve means in response to the introduction of an object into said turning chamber in which it is turned by the impacts of said jets.

Further objects and advantages of the invention will be more fully apparent from the following description and the accompanying drawings illustrating a preferred embodiment of the invention, and in which:

FIG. 1 shows, partly in section, the most important driving means and other essential members of the apparatus according to the invention;

FIG. 2 shows the means for supplying and distributing compressed fluid to the jet nozzles;

FIGS. 3, 4 and 5 are side views of the turning chamber, a feeding out chute associated therewith, and a feed slide by means of which match books are introduced into the feeding out chute from the turning chamber;

FIGS. 6, 7 and 8 are end views corresponding to FIGS. 3, 4 and 5 respectively; and FIG. 9 is a chart elucidating the individual steps in the control of the supply of compressed fluid to the jet nozzles.

The apparatus according to FIG. 1 which is mechanically coupled to the book-match making machine and is driven in synchronism therewith comprises a housing 1, a drive shaft 2 connected to the book-match making machine (not shown), a bearing 3 in which one end of the drive shaft is journalled, and a worm 4 secured to the drive shaft. The worm 4 meshes with a worm wheel 5 secured to a shaft 6 to which is secured a second worm 7 which meshes with a second worm wheel 8. The latter is rigidly secured to a substantially vertical shaft 9 the lower end of which is journalled in a bearing 10 secured to the housing 1.

Through a chain transmission (not shown) shaft 6 drives a cam shaft 12 which is the principal drive shaft of the machine and upon which two cams 13 and 14, among others, are rigidely secured. Each cam cooperates with a cam follower roller 15 and 16 respectively which are rotatably journalled on individual levers 17 and 18 respectively. The lever 17 which is biased to the left (counter-clockwise) by a spring 19 is by means of a universal joint 11 journalled in such a way, that it can rock on the one hand in the plane of the drawing under the influence of the cam 13 and the spring 19, and on the other hand perpendicularly to the plane of the drawing. A feeding slide 20 is hingedly secured to the upper end of the lever 17. The other lever 18 which is rockable on a stub shaft 21 and biased in the clock-wise direction by a spring 22 is by means of a link 23 connected to a piston rod 24 carrying a piston 25 which reciprocates upwards and downwards in a turning chamber 26 under the joint influence of the cam 14 and the spring 22, as is clearly shown in FIGS. 3–8. The piston 25 is comprised of two halves 25a, 25b, which suitably are hingedly connected to each other and are biased towards each other by a spring (not shown) and between which the match books are clamped.

Above the housing 1 there is provided a track or guideway 28 connecting the output of the book-match making machine (not shown) to the turning apparatus according to the invention. Above and parallel to the guide-way 28 which leads to the turning chamber 26 which is open towards the guide-way there runs an endless chain 29 around a suitable number of chain wheels (not shown) one of which is driven from the shaft 9. The chain 29 is provided with dogs 30. After having been subjected to the last operation in the book-match making machine the finished match books which are designated 31 are transferred by ejecting arms (not shown) to the guide-way 28 in which they are advanced, past an attendant who examines them, to the turning apparatus by the dogs 30 of the chain 29. Above that end of the guide-way that is located adjacent to the turning apparatus there is provided a guide 33 which operates to maintain the match books upright in a vertical position. Above this guide 33 there is provided a microswitch 34 the movable contact of which depends into an opening in the guide 33. After that the match books have been advanced to a position under the guide 33 they are clamped, one by one, by the feeding slide 20 which rapidly advances them past the micro-switch 34 the movable contact of which is hereby caused to momentarily engage the stationary contact, to the turning chamber 26 in which they are turned by means of jets of compressed air in a manner to be described later on, after which they are ejected by the piston 25 into an arcuate chute 36 forming a downwards extending continuation of the turning chamber 26. The match books 31 are prevented from springing backwards into the turning chamber by springs 37 (FIGS. 6–8) which are provided in the chute. The match books pass through the chute 36 and emerge therefrom on to a table where said attendant seizes them and places them in cartons in which they are packed.

The pneumatic system for the turning of the match books and its control means which are located partly upon, partly within the housing 1 are most clearly shown in FIG. 2 to which it is now referred, and in FIGS. 3–8. The system comprises a source 38 of compressed fluid, from which a duct 39 extends which is bifurcated into two branches 40 and 41. In the duct 40 there are inserted a mechanical valve 42 and an electromagnetic valve 44 after each other. In the duct 41 there are inserted a mechanical valve 43 and an electromagnetic valve 45 after each other. The duct 40 is bifurcated into two branches 46 and 48 each of which leads to a pair of nozzles 50, 50 and 52, 52 respectively, forming one set together. The duct 41 is bifurcated into two branches 47 and 49 each of which leads to a pair of nozzles 51, 51 and 53, 53 respectively, forming one set together. The nozzles 50, 53 and 51, 52 respectively are located in mutually opposed walls of the turning chamber 26.

The mechanical valves 42, 43 which are diagrammatically illustrated in their closed position in FIG. 2 are opened and closed coincidentally, and they are transferred in synchronism with the movements of the piston 25, said valves being opened substantially at the same time as the piston reaches its upper end position, as is shown in FIG. 7. The valves 42, 43 are transferred by cams 54 and 55 respectively which are, like cams 13 and 14 secured to the cam shaft 12 (FIG. 1).

Since the match books have a profile which is wedge-shaped on the whole, that is has one narrower end and another thicker end, approximately every second match book should be turned in the one direction, whereas the remainder of the match books should be turned in the opposite direction to make a file of match books arranged e.g. in a carton become as sparse (or dense) at the top as at the bottom, and this is accomplished, according to the invention, by applying compressed fluid alternately to the two sets of nozzles 50, 52 and 51, 53 respectively. As will be evident, particularly from FIG. 7, the match books are turned in one direction (counter-clockwise) when the jets of compressed fluid come from the nozzles 51, 53 which form one set, and in the opposite direction (clockwise) when the jets come from the set of nozzles 50, 52. This alternating supply of compressed fluid to the two sets of nozzles 50, 52 and 51, 53 respectively is accomplished by the magnetic valves 44, 45 and their control means which are located upon the housing 1 and most clearly shown in FIG. 2.

The control means comprise the micro-switch 34 described in connection with FIG. 1. This switch is interconnected in the circuit of an electromagnet 56 having an armature in the shape of a pawl 57 pivotable on an axis 58 and biased in counter-clockwise direction by a spring 59. Associated with the pawl 57 is a ratchet wheel 60 which has 40 teeth and is secured to a shaft 61 to which a notch-wheel 62 having 20 notches and 20 teeth is also rigidly secured. For every current impulse to the electromagnet 56 caused by a match book the armature of the magnet, that is the pawl 57, advances the ratchet wheel 60 one tooth and the notch-wheel half a pitch, that is from a tooth to a notch or from a notch to a tooth. Adjacent to the notch-wheel there is provided a microswitch 63 having a movable contact 64 and two stationary contacts 65, 66. The movable contact is provided with a projection 67 cooperating with the teeth and the notches of the notch-wheel to close the circuit to the stationary contact 65 and the magnetic valve 45 when the projection rests in a notch of the notch-wheel 62, and to close the circuit to the stationary contact 66 and the magnetic valve 44 when the projection 67 bears upon a tooth of the notch-wheel 62. When energized the magnetic valves 44, 45 admit pressure fluid to their respective sets of nozzles 50, 52 and 51, 53 respectively during the admission periods of the mechanical valves.

As is evident from the above and from the chart according to FIG. 9 every match book closes the circuit to the electro-magnet 56 when passing the micro-switch 34. Consequently, the magnet becomes energized and advances the ratchet wheel 60 and the notch-wheel 62 a tooth-pitch of the ratchet wheel and half a notch-pitch of the notch-wheel by means of its pawl 57. At its advancement the notch-wheel 62 actuates the switch 63 which in its turn transfers the magnetic valves for directing the compressed fluid to the two sets of nozzles 50, 52 and 51, 53 respectively. Thanks to the control of the magnetic valves 44, 45 by the match books proper, the turning apparatus operates in the intended way even though one or more match books should be missing in the chain 29.

The turning apparatus according to the invention could advantageously and without greater expense be supplemented with an apparatus for counting the match books. This apparatus which considerably facilitates the packing of a proper number of match books in a carton and forms the subject matter of my co-pending United States patent application, Ser. No. 326,963, filed on Nov. 29, 1963, and assigned to the assignee of the present application. This application comprises, in the disclosed embodiment, a ratchet wheel 70 which is rotatably journalled on a shaft 71 parallel to the shaft 61 and provided with movable lifters 72. The ratchet wheel 70 has 100 teeth, and the spacing between the lifters is, counted in teeth 33, 34, 33. The pitch between the teeth, when measured along the circumference, is the same as that of the wheel 60. The wheels 60 and 70 are arranged side by side in such a way, that they have a common generatrix coinciding with the feed edge of the armature 57. Consequently they are advanced step by step simultaneously with each other. However, when a lifter 72 engages the pawl 57, this is momentarily lifted for one feeding step. On account of this, the advancement of the ratchet wheel 60 and consequently the turning operation too, is inhibited for every 33rd, 34th, 33rd, 33rd, 34th . . . teeth of the ratchet wheel 70. Accordingly, the attendant can easily distinguish bundles of 33, 34, 33 . . . match books and transfer these bundles to cartons intended to hold e.g. 200 match books without having to count them.

While the invention has been particularly shown and described with reference to one preferred embodiment thereof, it will be understood by those skilled in the art that various changes in form and details may be made therein without departing from the spirit and scope of the invention. Thus, the invention may be utilized also for turning other objects than match books. Furthermore, a light-source and a photocell may be substituted for the switch 34.

The word "sets" and "groups" as used herein and in the following claims should be construed in their broadest sense, i.e. as encompassing the special case of one single member per "group" or "set."

What I claim is:

1. In the stacking of a series of individual, similar, substantially flat-wedge-shaped objects, such as match books, the method of orienting said objects in predetermined, alternating directions, comprising the steps of advancing said objects sequentially along a predetermined unbranched path common to all of said objects, each object being preoriented in the same direction, directing a first series of jets of compressed fluid against at least one eccentric point of every second object of the series at a station in said path for rotating these alternate objects through an angle of approximately 90° in one direction on an approximately predetermined axis of rotation extending near the center of the respective object and directing a second series of jets of compressed fluid against at least one different, eccentric point of each of the remaining alternate objects of the series at said station for rotating said remaining alternate objects in opposite direction through an angle of approximately 90° on substantially the same said axis of rotation, and feeding out said objects sequentially from said station into a common outlet chute included in said unbranched common path to form hereby in said chute a stack in which every second object is oriented in a first direction and the remainder of the objects are oriented substantially in the opposite direction, so that the wedge effect of each object is offset by the wedge orientation of the immediately adjacent objects.

2. Method as claimed in claim 1, in which a set of jets of compressed fluid are directed against each object.

3. Method according to claim 2, in which each set of jets comprises at least two jets directed against selected points on two opposite faces of each object.

4. Method according to claim 3, in which each set of jets comprises at least two pairs of jets.

5. Method according to claim 4, in which the two jets of each pair are directed towards points which are located on the same face of the object and on the same side of the axis of intended rotation of the object.

6. Method as claimed in claim 1, comprising the steps of alternately activating and extinguishing said jets by means of electromagnetic valves, controlling said valves by feeding each object of the series in close proximity to a switch for actuating said switch when passing it.

7. Apparatus for orienting a series of individual objects, comprising a turning chamber; a feeding device for introducing said objects one by one into said chamber in a substantially vertical position; a source of compressed air; at least two vertically spaced jet nozzles mounted in each of two opposite side walls of said chamber and directed substantially towards the center of said chamber; means connecting the upper jet nozzle of one side wall with the lower jet nozzle of the opposite side wall for forming a first, simultaneously operative set; means connecting the lower jet nozzle of said one side wall with the upper jet nozzle of said opposite side wall forming a second, simultaneously operative set; ducts connecting said source of compressed air to said sets of jet nozzles; valve means arranged in said ducts for controlling the supply of compressed air to said sets of jet nozzles, and control means located at the entrance of said turning chamber and actuatable by passing objects for alternately causing said two sets of valves to open thereby permitting jets of air to rotate every second object in a clockwise direction about a substantially horizontal axis from the substantially vertical position to a substantial horizontal position and the remaining objects in a counter-clockwise direction about a substantially horizontal axis from the substantially vertical position to said substantial horizontal position; and an outlet chute which leads from said turning chamber and in which a stack of superimposed alternately oriented objects is received.

8. Apparatus for orienting a series of individual objects comprising a turning chamber, a feeding device for introducing said objects one by one in a predetermined orientation into said turning chamber, a source of compressed fluid, two sets of jet nozzles opening into said turning chamber, ducts connecting said source of compressed fluid to said sets of jet nozzles, valve means arranged in each of said ducts for governing the supply of compressed fluid to said sets of jet nozzles, control means for alternately opening said two sets of valve means, thereby rotating every second object in a first direction and rotating the remaining objects in the opposite direction, said control means being responsible to each of said objects being advanced by said feeding device, reciprocating piston means for sequentially feeding out said objects from said turning chamber, and at least one shutting off means for the compressed fluid, which is interconnected in said ducts in series with said valve means and is operated in synchronism with said piston means.

9. Apparatus for orienting a series of individual wedge-shaped objects, such as match books, comprising a turning chamber, a feeding device for introducing the said objects one by one into said turning chamber, each object being preoriented in the same direction, a source of compressed fluid, two sets of jet nozzles opening into said turning chamber, ducts connecting said source of compressed fluid to said sets of jet nozzles, valve means arranged in each of said ducts for governing the supply of compressed fluid to said sets of jet nozzles, and control means for alternately opening said two sets of valve means, thereby subjecting every second object to at least one eccentrically directed jet impact for rotating these objects, in a first direction through an angle of approximately 90° and subjecting the remaining objects to at least another one eccentrically directed jet impact for rotating said remaining objects in the opposite direction through an angle of approximately 90°, said governing means being responsive to each of said objects being advanced by said feeding device, a single outlet chute which leads directly from the turning chamber and in which a stack of superimposed ultimately oriented objects is formed, said feeding device, said turning chamber, and said outlet chute forming together a continuous, sole path of movement of the objects.

10. Apparatus according to claim 9, in which each jet nozzle of one set opens into a wall of the turning chamber substantially opposite to a corresponding jet nozzle belonging to the other set and opening into the opposite wall of said turning chamber.

11. Apparatus according to claim 10, in which each set of jet nozzles comprises two pairs of nozzles, said pairs being located diagonally with respect to each other in the one and the other of said opposite walls respectively of said turning chamber.

References Cited
UNITED STATES PATENTS

| | | | |
|---|---|---|---|
| 2,668,483 | 2/1954 | Sykes | 214—6.5 |
| 2,990,665 | 7/1961 | Magnuson | 214—1 |
| 2,991,893 | 7/1961 | Kirsch et al. | 214—11 |
| 2,997,185 | 8/1961 | Moean et al. | 214—1 |

GERALD M. FORLENZA, *Primary Examiner.*

R. B. JOHNSON, *Assistant Examiner.*